3,826,788
PROCESS FOR CROSSLINKING HYDROPHILIC
COLLOIDS USING TRIAZINE DERIVATIVES
Alfred Froehlich, Marly-le-Grand, Paul Tschopp, Marly, and Werner Deuschel, Villars-sur-Glane, Switzerland, assignors to Ciba-Geigy AG, Basel, Switzerland
Filed Mar. 28, 1972, Ser. No. 238,896
Claims priority, application Switzerland, Apr. 5, 1971, 5,019/71
Int. Cl. C08f 3/34; C08h 1/06; C09h 7/00
U.S. Cl. 260—91.3 VA         12 Claims

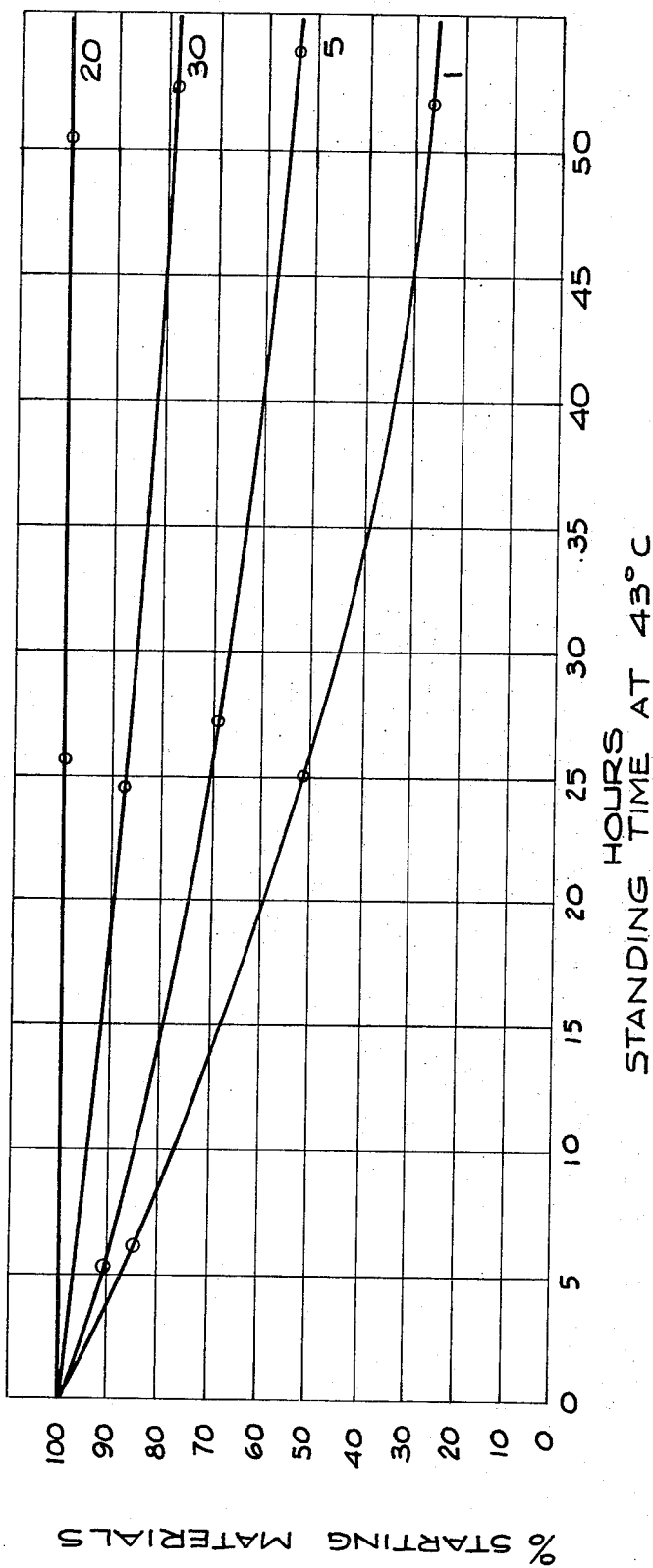

ABSTRACT OF THE DISCLOSURE

A process for crosslinking hydrophilic colloids, which comprises performing the crosslinking with a compound having a half-life for decomposition in aqueous solution at 40° C. of at least 8 hours, of the formula

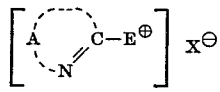

wherein

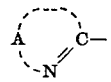

is a certain organic radical, $E^\oplus$ is an anion radical and $X^\ominus$ is an anion as well as a photographic material containing a colloid layer crosslinked with said compounds, are described.

---

The present invention relates to a process for the crosslinking of hydrophilic colloids by means of onium compounds.

Crosslinking agents for hydrophilic colloids which contain onium groups, bonded to a carbon atom of an aliphatic chain, as groups which confer solubility in water and which dissociate from the compound, are already known from the literature (compare, for example, German Published Specification 1,547,750).

The process according to the invention for crosslinking hydrophilic colloids which contain amino, imino and/or hydroxyl groups is characterised in that as the crosslinking agent there is used at least one compound of which the half-life for decomposition in aqueous solution at 40° C. is at least 8, preferably at least 12, hours and which corresponds to the formula

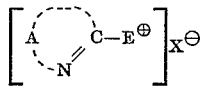

(I)

wherein

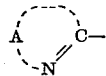

denotes a heterocyclic radical of which the —N=C— group forms a component of an at least 5-membered aromatically unsaturated hetero-ring, with A additionally containing at least one radical which can be split off, $E^\oplus$ denotes an ammonium radical or a phosphonium or sulphonium radical and $X^\ominus$ denotes an anion.

"Radical which can be split off" is understood, in the following text, as a radical which is split off during the reaction of the crosslinking agent with the amino, imino or hydroxyl groups of the hydropholic colloid.

The radical which can be split off can be bonded to the heterocyclic ring directly or via an intermediate member, for example an organic radical or an oxygen, sulphur or nitrogen atom. If the radical which can be split off is ethoxy, 2,2,2-trifluoroethoxy or 2,2,2-trichloroethoxy group or an unsubstituted or substituted aryloxy fluorine atom, an alkoxy group which is unsubstituted or substituted by one or more halogen atoms or a nitrile or alkoxy group, such as, for example, a methoxy, ethoxy, methoxyethoxy, ethoxymethoxy, cyanomethoxy, cyanoethoxy, 2,2,2 - trifluoroethoxy or 2,2,2 - trichloroethoxy group or an unsubstituted or substituted aryloxy group, such as a phenoxy group. The heterocyclic ring can contain yet further substituents, such as a 5-membered or 6-membered saturated or unsaturated heterocyclic radical, an alkyl group, such as a methyl or ethyl group, which is optionally substituted by halogen atoms or alkyl, alkoxy, amino or carboxylic acid groups or functional derivatives of the last two, an aralkyl group, such as a benzyl group, an aryl group, such as a phenyl group, an alkylamino group, such as a dimethylamino group, a sulphonamido group, such as a phenylsulphonamido or p-toluenesulphonamido group, or the nitrile radical.

If the radical which can be split off is bonded to the heterocyclic ring via an intermediate member, it can represent a radical which is reactive towards amino, imino or hydroxyl groups, such as an aldehyde, chloromethyl, β-chloropropionyl, acrylyl, vinylsulphonyl, epoxy, ethyleneimino, isocyanato or acid chloride group.

A second radical which can be split off which may be present in the radical A can also be a second ammonium group which is bonded either directly to the atom grouping A or bonded to a further heterocyclic radical

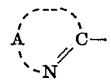

which is in turn bonded to the atom grouping A via a bonding member. Two heterocyclic radicals

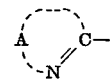

can also be linked via a shared monocyclic cycloammonium radical possessing two quaternary atoms, such as the N,N'-dimethyl-piperazinium radical.

Further possible hetero-atoms which can be present in the heterocyclic radical

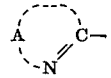

are, for example, nitrogen, oxygen or sulphur atoms.

Crosslinking agents which can be used in accordance with the invention are especially compounds of the formula

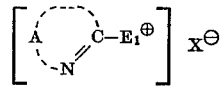

(II)

in which

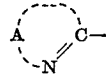

and $X^\ominus$ have the meanings indicated under the formula I and $E_1^\oplus$ denotes an alkylammonium radical or a monocyclic cycloammonium radical bonded via an unsubstituted or substituted quaternary ring nitrogen atom to the heterocyclic radical

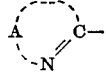

Crosslinking agents of particular interest are compounds of the formula

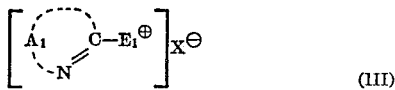

(III)

wherein $E_1^{\oplus}$ and $X^{\ominus}$ have the abovementioned meanings and

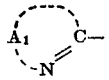

denotes a heterocyclic radical of which —N=C— group is a component of a 6-membered aromatically unsaturated hetero-ring with 2 or 3 ring nitrogen atoms which can be fused to a benzene ring, with $A_1$ additionally containing at least one radical which can be split off.

Possible substituents of the heterocyclic radical are halogen atoms, such as fluorine, chorine or bromine atoms, alkoxy groups which are unsubstituted or substituted by halogen or a nitrile or alkoxy group, such as, for example, methoxy, ethoxy, propoxy, methoxyethoxy, cyanomethoxy or 2,2,2-trichloroethoxy groups, an aryloxy group, such as a phenoxy group, an alkyl group such as methyl or ethyl, an unsubstituted or substituted aryl group such as a phenyl or chlorophenyl group, a lower alkylamino group with 1 to 4 carbon atoms per alkyl radical, a 5-membered or 6-membered saturated or unsaturated N-heterocyclic radical, an alkylsulphonamido or phenylsulphonamido radical or a nitrile group.

Examples of aromatically unsaturated N-heterocyclic radicals which may be mentioned are quinoxaline radicals and especially s-triazine, pyrimidine and quinazoline radicals.

Crosslinking agents which have proved particularly suitable are those which contain compounds of the formula

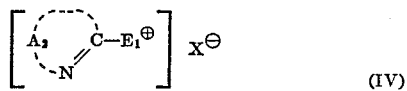

(IV)

wherein $E_1^{\oplus}$ and $X^{\ominus}$ have the abovementioned meanings and

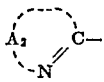

denotes a triazine radical substituted by halogen atoms and/or unsubstituted or substituted alkoxy groups and/or alkyl, halogenoalkyl, aryl or aryloxy groups or lower alkylamino or sulphonamido groups, a pyrimidine radical substituted by halogen atoms and/or lower alkyl or alkoxy groups and/or nitrile groups, a quinazoline radical substituted by one or more halogen atoms or a quinazoline radical substituted by one or more halogen atoms and lower alkyl groups.

Particularly interesting crosslinking agents are compounds of the formula

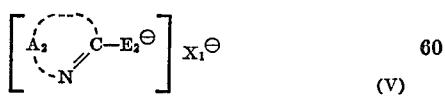

(V)

wherein

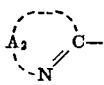

has the abovementioned meaning and $E_2^{\oplus}$ denotes an ammonium radical substituted by aliphatic, cycloaliphatic and/or araliphatic radicals or a monocyclic cycloammonium radical of which the quaternary linking nitrogen atom belongs to an aromatic ring or of which the quaternary linking nitrogen atom, substituted by an aliphatic radical, belongs to a monocyclic aliphatic ring which optionally contains further hetero-atoms, and $X_1^{\ominus}$ denotes a halogen, nitrate, sulphate, perchlorate, fluoborate, thiocyanate, sulphamate, hexafluophosphate, hexafluoantimonate or hexafluostannate ion.

In this preferred embodiment of the process according to the invention, compounds of the formula

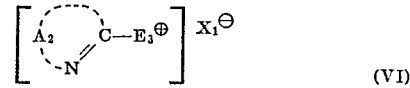

(VI)

are particularly used, wherein

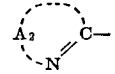

and $X_1^{\ominus}$ have the abovementioned meanings and $E_3^{\oplus}$ denotes an alkylammonium radical of which the quaternary linking nitrogen atom is substituted by an unsubstituted or substituted aliphatic hydrocarbon radical possessing 1–8 carbon atoms, by a 5-membered or preferably 6-membered cycloaliphatic radical or by an unsubstiuted or substituted benzyl radical, or denotes a monocyclic cycloammonium radical of which the quaternary linking nitrogen atom belongs to a 6-membered aromatic ring or of which the quaternary linking nitrogen atom substituted by an aliphatic radical belongs to a 5-membered or 6-membered monocyclic aliphatic ring which may possess further oxygen, sulphur or nitrogen atoms.

Advantageous results are achieved when using compounds of the formula

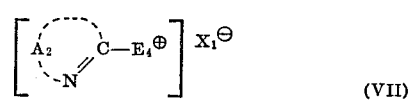

(VII)

wherein

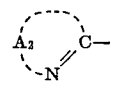

and $X_1^{\ominus}$ have the abovementioned meanings and $E_4^{\oplus}$ denotes an alkylammonium radical of which the quaterary linking nitrogen atoms is substituted by an alkyl, alkenyl, alkinyl, carbalkoxyalkyl, cyanoalkyl or alkoxyalkyl radical with a total of 1 to 5 carbon atoms, the cyclohexyl radical or the benzyl radical, a monocyclic cycloammonium radical substituted at the quarternary linking nitrogen atom by an alkyl radical which is unsubstituted or substituted by nitrile or alkoxy, with a total of 1 to 5 carbon atoms, and of which the quaternary linking nitrogen atom belongs to a 5-membered or preferably 6-membered monocyclic aliphatic ring which may contain a further nitrogen, sulphur or oxygen atom, or a pyridine ring which is optionally substituted by alkyl with 1 to 3 carbon atoms or acylamino with a total of 2 to 3 carbon atoms.

A particularly good embodiment of the process according to the invention is based on the use of compounds of the formula

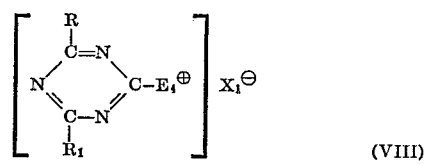

(VIII)

wherein $E_4^{\oplus}$ and $X_1^{\ominus}$ have the abovementioned meanings and R represents a chlorine atom, an alkoxy group, such as a methoxy, ethoxy or propoxy group, an alkoxy group substituted by halogen or a nitrile or alkoxy group, such as a 2,2,2-trichloroethoxy, a cyanomethoxy or a β-methoxyethoxy group, and $R_2$ represents an unsubstituted alkoxy group such as a methoxy or ethoxy group, an alkoxy group substituted by halogen or a nitrile or alkoxy group, such as a 2,2,2-trichloroethoxy, a cyanomethoxy or a β-methoxyethoxy group, a phenyl radical which is unsubstituted or substituted by a chlorine atom, an amino radical substituted by alkyl groups with 1 to 4 carbon atom, a piperidino radical or a phenylsulphonamido radical.

Preferred compounds of the formula VIII are those wherein R and $R_1$ each denote a methoxy, ethoxy, propoxy, cyanomethoxy, 2,2,2-trichloroethoxy or β-methoxyethoxy radical.

In a particularly preferred embodiment of the process according to the invention, compounds of the formula

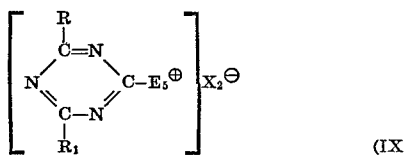  (IX)

are used, wherein R and $R_1$ have the abovementioned meanings, $E_5^\oplus$ denotes the pyridinium radical, a 1-lower alkyl-morpholinium or -thiomorpholinium radical, a 1-lower alkyl- or cyanoalkyl-pyrrolidinium radical, a trialkyl- or N,N-dialkyl-N-(cyanoalkyl)-ammonium radical with 1 to 3 carbon atoms per alkyl radical, a N,N-dialkyl-N-cyclohexylammonium radical, a 1 - lower alkyl-piperidinium radical or a N,N-dialkyl-N-alkoxycarbonyl-alkyl-ammonium radical and $X_2^\ominus$ denotes a perchlorate, chloride, fluoborate or hexafluophosphate ion.

Preferred 1-lower alkyl - morpholinium, -piperidinium and -pyrrolidinium radicals are preferably the 1-methyl- or 1-ethyl-morpholinium radical, the 1-methyl- or 1-ethyl-piperidinium radical and the 1-methyl- or 1-(4'-cyanobutyl)-pyrrolidinium radical. N,N - Dialkyl-N-cyanoalkyl-ammonium radicals to be mentioned preferably are the N,N-dimethyl-N-(cyanomethyl)- and the N,N-dimethyl-N-(β-cyanoethyl)-ammonium radical, whilst N,N-dialkyl-N - alkoxycarbonyl - alkylammonium radicals to be mentioned are the N,N-dimethyl-N-(ethoxycarbonyl)-methyl, and the N,N-dimethyl-N-(β-ethoxycarbonyl) - ethyl - ammonium radical and the N,N-dimethyl-N-propin-2-yl-ammonium radical.

Compounds of the formula

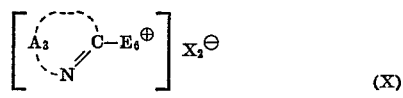  (X)

wherein

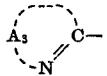

denotes a pyrimidine radical substituted by one or more chlorine atoms and/or a nitrile, methoxy or ethoxy group or a quinazoline radical substituted by a chlorine atom, $E_6^\oplus$ denotes the pyridinium radical, a 1-lower alkyl- morpholinium radical or a 1-lower alkyl-piperidinium radical, and $X_2^\ominus$ denotes the perchlorate, chlorine, fluoborate or hexafluophosphate ion are also suitable for carrying out the process according to the invention.

Lower alkyl in a morpholinium or piperidinium radical $E_6^\oplus$ is preferably the methyl and ethyl radical.

Good results are also achieved on using compounds of the formula

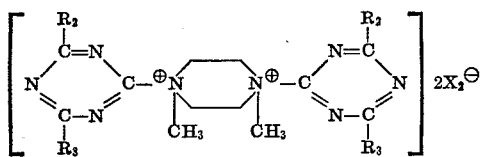

wherein $R_2$ and $R_3$ each represent a methoxy or ethoxy radical and $X_2^\ominus$ has the abovementioned meaning.

The ammonium compounds to be used according to the invention, or their various radicals

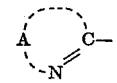

can be derived, for example, from the following heterocyclic structures or basic compounds.

(a) N-Heterocyclic Compounds 2,4-dichloro-6-ethyl-1,3,5-triazine,
2,4-dichloro-6-methyl-1,3,5-triazine,
2,4-dichloro-6-phenyl-1,3,5-triazine,
2,4-dichloro-6-ethoxy-1,3,5-triazine,
2,4-dichloro-6-methoxy-1,3,5-triazine,
2,4-dichloro-6-[N-methyl-(N,N'-dimethylsulphamoyl-amino)-1,3,5-triazine,
2,4-dichloro-6-p-chlorophenyl-1,3,5-triazine,
2-chloro-4-ethyl-6-ethoxy-1,3,5-triazine,
2-chloro-4-methyl-6-ethoxy-1,3,5-triazine,
2-chloro-4,6-dimethoxy-1,3,5-triazine,
2-chloro-4,6-diethoxy-1,3,5-triazine,
2-chloro-4,6-diisopropoxy-1,3,5-triazine,
2-chloro-4,6-di-n-butoxy-1,3,5-triazine,
2-chloro-4-methoxy-6-phenyl-1,3,5-triazine,
2-chloro-4-ethoxy-6-phenyl-1,3,5-triazine,
2-chloro-4-methyl-mercapto-6-phenyl-1,3,5-triazine,
2-chloro-4-methoxy-6-p-chlorophenyl-1,3,5-triazine,
2-chloro-4-methoxy-6-diethylamino-1,3,5-triazine,
2-chloro-4-methoxy-6-piperidyl-1,3,5-triazine,
2-chloro-4-methoxy-6-phenylsulphonylamino-1,3,5-triazine,
2-chloro-4-methoxy-6-phenylcarbonylamino-1,3,5-triazine,
2-chloro-4-methoxy-6-methylsulphonylamino-1,3,5-triazine,
2-chloro-4-methoxy-6-cyanomethoxy-1,3,5-triazine,
2-chloro-4,6-bis-cyanomethoxy-1,3,5-triazine,
2-chloro-4-ethoxy-6-(2',2',2'-trichloroethoxy)-1,3,5-triazine,
2-chloro-4-n-propoxy-6-(2',2',2'-trichloroethoxy-1,3,5-triazine,
2-chloro-4,6-bis-(2',2',2'-trichloroethoxy)-1,3,5-triazine,
2-chloro-4-methoxy-6-phenoxy-1,3,5-triazine,
2-chloro-4-ethoxy-6-phenoxy-1,3,5-triazine,
2-chloro-4-ethoxy-6-benzyl-1,3,5-triazine,
2,4-dichloroquinazoline,
1,1',4,4'-tetrachloro-bis-phthalazine-7,7'-dicarbonyl-ethylene-diamine,
2,4,5-trichloro-6-methylpyrimidine,
2,6-dichloro-4-methoxy-pyrimidine,
2-chloro-4-methoxyquinazoline,
2,4,6-trichloropyrimidine and
2,4-dichloro-5-cyano-pyrimidine, (b) Basic Compounds Pyridine,
3-methyl-pyridine,
4-methyl-pyridine,
3,5-dimethyl-pyridine,
3-ethyl-pyridine,
4-ethyl-pyridine,
4-n-propyl-pyridine,
3-acetylamino-pyridine,
N-methylpiperidine,
N-ethylpiperidine,
N-methylmorpholine,
N-ethylmorpholine,
4-methyl-thiomorpholine-1,1-dioxide,
N,N-dimethylpiperazine,
N-methylpyrrolidine,
N-ethylpyrrolidine,
N-(β-cyanoethyl)-pyrrolidine,
N(γ-cyanopropyl-)-pyrrolidine,
N(δ-cyanobutyl-)-pyrrolidine, trimethylamine,
triethylamine,
N-n-butyl-N,N-dimethylamine,
N-n-octyl-N,N-dimethylamine,
N-methyl-N-N-diethylamine,
N-cyclohexyl-N,N-dimethylamine,
3-N,N-dimethylamino-sulpholane,
N,N-dimethyl-N-(β-cyanoethyl-)-amine and
N,N-dimethyl-N-propin-2-ylamine.

The anion $X^{\ominus}$ in the formlae (I) to (X) are appropriately colourless acid anions. Where the crosslinking agents are used for crosslinking the hydrophilic colloids in photographic emulsions, these anions should of course appropriately be photographically inert, that is to say they should not influence the solubility of the silver salts through precipitation or complex formation and equally they should not affect the sensitivity and the gradation. Such anions are, for example, the nitrate, chloride, sulphate, perchlorate, fluoborate, hexafluophosphate, -antimonate, -stannate, sulphamate or thiocyanate ion.

It is furthermore advantageous, for reasons of handling and storage, that the compounds are non-hygroscopic or only slightly hygroscopic. For this reason, anions which give only slightly hydroscopic or non-hydroscopic ammonium salts, such as for example, the perchlorate, fluoborate or hexafluophosphate anion, are preferred.

The onium compounds to be used according to the invention can be manufactured by, for example, reacting a halogen compound

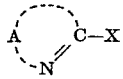

wherein X denotes fluorine, chlorine or bromine, with a basic compound E, especially a tertiary amine, in accordance with the equation

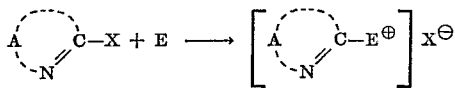

The reaction takes place, for example, at temperatures between 0° C. and room temperature, and is preferably carried out at 0° to 5° C. by combining the reactants in the presence of a solvent.

The halides which can be manufactured in this way are frequently strongly hygroscopic and are therefore appropriately converted into a perchlorate or fluoborate, the same aim of conversion also being achievable by adding sodium perchlorate or sodium fluoborate to the solution of the halogen compound

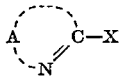

and subsequently reacting the resulting corresponding salt with a basic compound E, for example in accordance with the equation

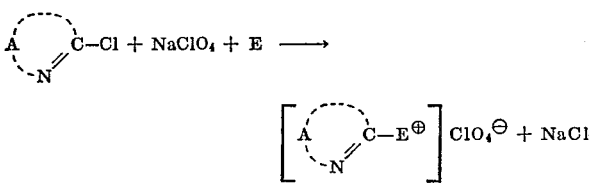

The onium salts can also be separated out as a type of mixed salt or double salt, for example as onium-sodium perchlorate-chlorides.

The agents defined in accordance with the invention can be used in the textile industry and leather industry, in the manufacture of paper, and in the plastics industry, glue industry and gelatine industry. They are above all employed as hardeners for water-soluble polymers such as polyvinyl alcohol, gelatine or gelatine derivatives, especially in the form of layers, containing such colloids, of photographic materials. The reaction of the gelatine with these compounds generally takes place easily and in the usual manner. The compounds are as a rule sufficiently water-soluble.

In most cases it suffices to add the products to be used according to the invention as an aqueous solution or in a solid form, which is as finely divided as possible, to an aqueous solution of the hydrophilic colloid, with good stirring.

Thus it is possible, for example, to bring together a solution of the crosslinking agents in water, or in a mixture with ethanol or methanol, with gelatine at a normal or slightly elevated temperature and to cast the gelatine, which may contain silver halide and/or other materials for producing photographic images, such as, for example, coupling agents, dyestuffs and/or the tertiary amines listed in German Published Specification 1,914,955, onto a base in the usual manner, and to dry the layer if appropriate. The layer can then be left alone at an elevated temperature for a certain time, for example up to 24 hours, or at room temperature. Hereupon, hardening takes place rapidly and to an increasing extent; the melting point of the gelatine is substantially raised, for example by 25 to 60° C., and the swelling factor is correspondingly reduced.

The amount of the hardener employed depends on the desired degree of hardening but is appropriately 0.1 to 10 percent by weight relative to the weight of dry gelatine.

A particular advantage of the present crosslinking agents is that when used even at a low concentration they impart a sufficient degree of hardness to the gelatine layers rapidly, for example after 18 to 24 hours, so that the cast materials can be tested by processing a sample immediately following its manufacture, even at elevated temperature or in chemically aggresive processing baths.

Since as a rule no acid is formed in the reaction of the crosslinking agents according to the invention with the gelatine, no pH change occurs in the emulsion layer and the health hazard is reduced.

The hardening effect itself is very stable and even after prolonged storage at temperatures of about 40° C. and a relative atmospheric humidity of about 70% the melting point of a hardened gelatine remains above 90° C. The degree of hardening is also not changed significantly by acids or bases even on prolonged action, which indicates great resistance to hydrolysis of the hardener-gelatine bond.

The compounds of the formula I additionally generally possess good solubility in water and, in accordance with the definition, are sufficiently stable, or even very stable, in aqueous solutions. This property is particularly important since, for example, their applicability in photographic technology decisively depends thereon. Thus, for example, it is particularly desirable, for the continuous manufacture of photographic materials, that batches of solutions of crosslinking agents should remain stable at room temperature for several hours or days and that the concentration of the hardener for gelatine, and hence its crosslinking ability, should not drop or should only drop insignificantly. On the other hand it is equally important that the hardener should, for the same reason, not decompose, or only decompose insignificantly in the casting solution at about 40° C. during the requisite waiting time and dwell time, so as to retain, over several hours, its full crosslinking action during casting, drying and storage of the photographic material.

The compounds of the formula I meet these strict requirements if the half-life for decomposition in aqueous solution at 40° C. is at least 8 and preferably 12 hours.

The time course of the decomposition in water at 40° or 43° C. can be measured in a simpler manner, independently of the process claimed here, in relation to the change in the NMR signals, for example of the bands of the alkyl protons of alkoxy groups which are present, or of the alkylamino groups which may be present, in heavy water. The time at which the material is half decomposed can easily be determined from the shape of the curves thus obtained. The stability of crosslinking agents which can be used in accordance with the invention is illustrated in FIG. 1 and in the following Examples A to C. In Examples A to C the percentages denote percentages by weight and the melting points are uncorrected.

Example A

If a 1% strength aqueous solution of the compound 4-(4',6'-dimethoxy-s-triazin - 2' - yl)-4-methylmorpholinium chloride (Manufacturing Example No. 1) is prepared and kept for 32 hours at 40° C., and 2.8 ml. are added at time intervals of 0, 4, 8, 24 and 32 hours to 20 ml. of an 8% strength gelatine solution freshly prepared in each case by stirring for 4 hours, this gelatine solution is cast on a film base of size 18 x 24 cm. and the melting point is then determined after 24 hours' storage at 23° C. and 42% relative humidity and after 6 days' storage at 43° C. and 69% relative humidity, the values in Table 1 are obtained.

TABLE 1

| Hardener added to the gelatin solution after hours— | M.P.[1], °C., after 24 hours' storage at 23° C./42% RH.[2] | M.P., °C., after 6 days' storage at 43° C./69% RH |
|---|---|---|
| Dwell time at 40° C.: | | |
| 0 | >95 | >95 |
| 4 | >95 | >95 |
| 8 | >95 | >95 |
| 24 | >95 | >95 |
| 32 | 95 | 95 |

[1] M.P. denotes melting point throughout the description.
[2] RH=relative humidity.

If the hardener solution is left in the storage vessel not at 40° C. but at room temperature of 20 to 25° C., no decrease in the hardening action is detectable even after 96 hours.

Example B

The stability of compounds according to the invention in a gelatine solution at 40° C. is shown, with the aid of the change in melting point, by Table 2.

100 ml. portions of an 8% strength gelatine solution are mixed with 22 ml. of an aqueous 1% strength solution of the compounds N,N-dimethyl-N-($\beta$-ethoxycarbonyl)-ethyl-N-(4,6-diethoxy-s-triazin-2-yl) - ammonium perchlorate (Manufacturing Example No. 29) and 1-(4',6'-diethoxy-s-triazin-2'-yl)-1-methylpiperidinium perchlorate (Manufacturing Example No. 30), the mixtures are kept at 40° C. for 4 hours, and 20 ml. portions of these gelatine solutions are cast, 0, 1, 2 and 4 hours after mixing in the hardener, onto a film of size 18 x 24 cm. The film is dried at 35° C. with circulating air and stored for 24 hours at 23° C. and 42% relative humidity, and the melting point of the gelatine layers is measured.

TABLE 2

| Dwell time of the gelatine-hardener solution at 40° C., in hours | M.P. in ° C., of the layers containing the compounds from manufacturing examples | |
|---|---|---|
| | 29 | 30 |
| 0 | >95 | >95 |
| 1 | >95 | >95 |
| 2 | >95 | >95 |
| 4 | 95 | >95 |

Example C

Table 3 shows the melting point and the swelling factor [1] of a gelatine layer hardened in accordance with the invention, as a function of the dwell time at 40° C. of the gelatine solution provided with the hardener.

[1] Ratio of the layer thicknesses of the layer which has swollen in distilled water and of the dry layer.

120 ml. of an 8% strength gelatine solution are mixed with 26.4 ml. of a 1% strength solution of the compound from Example A and the mixture is kept at 40° C. for 6 hours. 20 ml. of this solution are cast, at intervals of 0, 1, 2, 4 and 6 hours, on a film of size 18 x 24 cm. and this film is dried with circulating air at 35° C. and subsequently stored for 24 hours at 23° C. and 42% relative humidity, and then, for complete hardening, for 6 days at 43° C. and 69% relative humidity.

TABLE 3

| Dwell time of the gelatine-hardener solution in hours at 40° C. | M.P., ° C. after 24 hours' storage at 23° C./42% RH | M.P., ° C. after 6 days' storage at 43° C./69% RH | Swelling factor after 6 days' storage at 43° C./69% RH |
|---|---|---|---|
| 0 | 95 | 95 | 5.3 |
| 1 | 95 | 95 | 5.45 |
| 2 | 95 | 95 | 5.8 |
| 4 | 51 | 80 | 6.2 |
| 6 | 46 | 70 | 6.4 |

The photographic properties are in general only affected insignificantly by the crosslinking with the aid of the compounds of the formula (I).

The hardeners are suitable for hardening (crosslinking) the most diverse layers containing gelatine, such as, for example, intermediate layers, emulsion layers, base layers, coating layers, backing layers and anti-halo layers. The layers can contain only the crosslinking agents and/or additives of the most diverse kind, such as, for example, silver halide, pigments, such as barium sulphate, titanium dioxide, silicon dioxide or pigments of organic nature, such as coloured pigments, and also image dyestuffs, colour coupling agents, sensitisers, filter dyestuffs, antihalo dyestuffs and masking dyestuffs, stabilisers, UV-absorbers, optical brighteners or other crosslinking agents.

In the case of the compounds of relatively low molecular weight it is possible, because of their good diffusibility in a multi-layer material, to add them only to the auxiliary layers in order to achieve, through diffusion, a hardening of the adjacent silver halide layers. However, with increasing molecular weight comparable compounds show decreasing diffusion when used in photographic layers. This property in several respects offers decisive advantages in the manufacture of multi-layer materials.

These new crosslinking agents can also be used as mixtures with other compounds suitable for crosslinking water-soluble colloids, especially gelatine.

The manufacturing examples which follow illustrate the manufacture of onium compounds which can be used in accordance with the invention.

MANUFACTURING EXAMPLES

Example 1

1.75 g. of 2 - chloro-4,6-dimethoxy-s-triazine are dissolved in 22.5 ml. of ether and a solution of 1.01 g. of N-methylmorpholine is added at 5 °C. The mixture is left to stand for 24 hours at room temperature and the crystals which have separated out are filtered off and rinsed with 50 ml. of ether. The crystals obtained are dried for 10 minutes in vacuo at 20° C. and 1.7 g. of colourless 4-(4',6' - dimethoxy-s-triazin-2'-yl)-4-methylmorpholinium chloride of melting point 123° C. are obtained.

Example 2

1.75 g. of 2 - chloro-4,6-dimethoxy-s-triazine are dissolved in 22.5 ml. of ether and 0.99 g. of N-methylpiperidine are added at 5° C. After standing for 24 hours at room temperature, the crystals which have separated out are filtered off, washed with 50 ml. of ether and dried for 10 minutes in vacuo at 20° C. 1.6 g. of 1-(4',6'-dimethoxy-s-triazin-2'-yl)-1-methyl-piperidinium chloride of melting point 154° C. are obtained.

Example 3

1.4 g. of sodium perchlorate are dissolved in 25 ml. of anhydrous ethanol and 1.75 g. of 2-chloro-4,6-dimethoxys-triazine are added at 10° C. 0.8 ml. of pyridine dissolved in 10 ml. of anhydrous alcohol are added to the clear solution at 5° C. and the mixture is left to stand for 24 hours at room temperature. The crystals which have separated out are filtered off, washed with 100 ml. of ethanol and dried in vacuo at 30° C. 2.4 g. of 1-(4',6'-dimethoxy-s-triazin-2'-yl)-pyridinium-sodium perchlorate-chloride of melting point 166° C. are obtained.

Example 4

1.4 g. of sodium perchlorate are dissolved in 35 ml. of anhydrous ethanol and 1.75 g. of 2-chloro-4,6-dimethoxy-s-triazine are added at 5° C. 1.4 g. of 3-acetylamidopyridine dissolved in 20 ml. of anhydrous ethanol are added to the clear solution and the mixture is left to stand for 24 hours. The crystals which have separated out are filtered off and rinsed with 100 ml. of ethanol. 1.3 g. of 1-(4',6'-dimethoxy-s-triazin-2'-yl) - 3 - acetylamido-pyridinium-sodium perchlorate-chloride of melting point 189° C. are obtained.

Example 5

1.4 g. of sodium perchlorate are dissolved in 35 ml. of anhydrous ethanol at 5° C.; 2.1 g. of 2-chloro-4,6-diethoxy-s-triazine are then added and 1.1 g. of N-methylmorpholine dissolved in 10 ml. of anhydrous ethanol are added to the clear solution at 5° C. After standing for 24 hours, the crystals which have separated out are filtered off, washed with 100 ml. of ethanol and dried in vacuo at 30° C. 1.8 g. of 4-(4',6'-diethoxy-s-triazin-2'-yl)-4-methyl-morpholinium-sodium perchlorate-chloride of melting point 174° C. are obtained.

Example 6

3.6 g. of 2,4-dichloro-6-methoxy-s-triazine are dissolved in a solution of 1.4 g. of sodium perchlorate in 30 ml. of acetonitrile and 1 ml. of pyridine is added at −15° C. A pale yellow-coloured precipitate forms. It is left to stand for one hour at room temperature, filtered off and washed with acetonitrile and with ether. After drying in vacuo at 30° C., 2.6 g. of colourless 1-(4'-chloro-6'-methoxy-s-triazin-2'-yl)-pyridinium-sodium perchlorate-chloride of melting point >300° C. are obtained.

Example 7

1.4 g. of sodium perchlorate are dissolved in 35 ml. of anhydrous ethanol and 3.1 g. of 2-chloro-4,6-diethoxy-s-triazine are added at 5° C. After the s-triazine has dissolved, a solution of 1.1 g. of N-ethylmorpholine in 5 ml. of anhydrous ethanol is added and the mixture is left to stand for 48 hours at room temperature. The crystals which have separated out are filtered off, washed with 20 ml. of ethanol and 20 ml. of ether and dried in vacuo at 30° C. 2.1 g. of 4-(4',6'-diethoxy-s-triazin-2'-yl)-4-ethyl-morpholinium-sodium perchlorate-chloride of melting point 158° C. are obtained.

4-(4',6'-Dimethoxy-s-triazin - 2' - yl)-4-ethyl-morpholinium-sodium perchlorate-chloride of melting point 168° C. is manufactured analogously by reaction of N-ethylmorpholine with 2-chloro-4,6-dimethoxy-s-triazine.

Example 8

3.5 g. of 2-chloro-4,6-dimethoxy-s-triazine are dissolved in 50 ml. of anhydrous ether and 2.9 ml. of N-ethylpiperidine dissolved in 20 ml. of anhydrous ether are added at room temperature. The mixture is left to stand for 24 hours and the crystals which have separated out are filtered off, rinsed with 50 ml. of anhydrous ether and dried in vacuo at 20° C. 3.5 g. of colourless 1-(4',6'-dimethoxy-s-triazin-2'-yl)-1-ethyl-piperidinium chloride of melting point 83° C. are obtained.

Example 9

1.8 g. of 2-chloro-4,6-dimethoxy-s-triazine are added to a solution of 1.4 g. of sodium perchlorate in 6 ml. of acetonitrile. When the solution is clear, 1.4 ml. of triethylamine are added. A yellow colouration first results, and white crystals slowly begin to separate out. The mixture is left to stand for 24 hours at room temperature, the sodium chloride which has separated out is filtered off (0.59 g.) and the acetonitrile is evaporated off in vacuo at 40° C. The residue is triturated with 30 ml. of anhydrous ether, filtered off and washed with ether. 2.9 g. of N-(4,6 - dimethoxy-s-triazin-2-yl)-N,N,N-triethylammonium-sodium perchlorate-chloride of melting point 122° C. are obtained.

Example 10

1.4 g. of sodium perchlorate are dissolved in 35 ml. of anhydrous ethanol and 3.1 g. of 2-chloro-4,6-diethoxy-s-triazine are added at 5° C. After the s-triazine has dissolved, a solution of 1.1 g. of N-methylpyrrolidine in 5 ml. of anhydrous ethanol is added and the mixture is left to stand for 48 hours at room temperature. The crystals which have separated out are filtered off, washed with 20 ml. of ethanol and 20 ml. of ether and dried in vacuo at 40° C. 1-(4',6'-Diethoxy-s-triazin-2'-yl)-1-methylpyrrolidinium-sodium perchlorate-chloride of melting point 90° C. is obtained.

If instead of 2-chloro-4,6-diethoxy-s-triazine, 2-chloro-4,6 - dimethoxy-s-triazine is used, 1-(4',6'-dimethoxy-s-triazin-2'-yl)-1-methyl-pyrrolidinium-sodium perchlorate-chloride of melting point 116° C. is obtained.

Example 11

1.99 g. of 2,4-dichloroquinazoline are dissolved in 35 ml. of ether and added to a solution of 1.4 g. of sodium perchlorate in 100 ml. of anhydrous ethanol at 5° C.; a solution of 0.8 g. of pyridine in 20 ml. of anhydrous ethanol is added dropwise at 0 to 5° C. over the course of half an hour. The mixture is left to stand for 24 hours and the crystals which have separated out are filtered off, washed with 40 ml. of ethanol and dried in vacuo at 40° C. 2.3 g. of 1 - (4'-chloro-quinazolin-2'-yl)-pyridinium-sodium perchlorate-chloride of melting point 208° C. are obtained.

N - (4-Chloro-quinazolin-2-yl)-N-(β-hydroxyethyl)-N,N-dimethylammonium perchlorate of melting point 157° C. is manufactured analogously from 2,4-dichloroquinazoline and dimethylaminoethanol.

Example 12

2.04 g. of 2-chloro-4,6-diethoxy-s-triazine are dissolved in 20 ml. of ether and a solution of 1.4 g. of N,N-dimethylcyclohexylamine in 20 ml. of ether is added dropwise over the course of one hour at 20° C. The mixture is left to stand for 24 hours and the crystals which have separated out are filtered off and washed with 50 ml. of ether. 2.4 g. of N,N-dimethyl-N-cyclohexyl-N-(4,6-diethoxy-s-triazin-2-yl)-ammonium chloride of melting point 47° C. are obtained.

Example 13

0.75 g. of sodium perchlorate and 0.9 g. of 2,4-dichloro-6-methoxypyrimidine are dissolved in 25 ml. of anhydrous ethanol and a solution of 0.5 g. of N-methylpiperidine is added at room temperature. The mixture is stirred for 48 hours at room temperature and the crystals which have separated out are filtered off, washed with 15 ml. of anhydrous ethanol and dried in vacuo at 30° C. 0.9 g. of 1-(4'-chloro-6'-methoxy-pyrimidin-2'-yl)-1-methyl-piperidinium-sodium perchlorate-chloride of melting point 138° C. is obtained.

Example 14

2.8 g. of sodium perchlorate are dissolved in 80 ml. of anhydrous ethanol and 1.75 g. of 2-chloro-4,6-dimethoxy-s-triazine are added at 5° C. A solution of 0.75 g. of N,N'-dimethylpiperazine in 20 ml. of ethanol is added dropwise over the course of 30 minutes. After 4 hours, the crystals which have separated out are filtered off, washed with 50 ml. of ethanol and 50 ml. of ether and dried in vacuo at 40° C. 2.7 g. of 1,4-bis-(4',6'-dimethoxy-s-triazin-2'-yl)-

1,4 - dimethyl-piperazinium-disodium perchlorate-dichloride of melting point 295° C. are obtained.

Example 15

2.9 g. of sodium perchlorate are dissolved in 75 ml. of anhydrous ethanol; 4.4 g. of 2-chloro-4-methoxy-6-phenyl-s-triazine are then added. When all the material has dissolved, 2 ml. of N-methylpiperidine are slowly added dropwise. The mixture is stirred for one hour at room temperature and the crystals which have separated out are filtered off, washed with 20 ml. of anhydrous ethanol and recrystallised from 65 ml. of anhydrous ethanol in order to remove sodium chloride. 5.1 g. of 1-(4'-methoxy-6' - phenyl-s-triazin-2'-yl)-1-methyl-piperidinium perchlorate of melting point 131° C. are obtained.

Example 16

2.04 g. of 2-chloro-4,6-diethoxy-s-triazine and 1.5 g. of sodium perchlorate are dissolved in 50 ml. of anhydrous ethanol and a solution of 1 g. of 1-dimethyl-aminopropionitrile in 20 ml. of ethanol is added dropwise at 5 to 10° C. The mixture is stirred for 12 hours at room temperature and the crystals which have separated out are filtered off washed with 30 ml. of ethanol and 20 ml. of ether and dried in vacuo at 40° C. They are recrystallised from ethanol and 2.3 g. of N,N-dimethyl-N-(β-cyanoethyl)-N-(4,6 - diethoxy-s-triazin - 2-yl)-ammonium perchlorate of melting point 103° C. are obtained.

Example 17

3.6 g. of 2,4-dichloro-6-methoxy-s-triazine are dissolved in a solution of 1.4 g. of sodium perchlorate in 30 ml. of anhydrous ethanol and 1 ml. of N-methylpiperidine is added at −15° C. The mixture is left to stand for one hour at room temperature and the resulting precipitate is filtered off and washed with acetonitrile and ether. After drying in vacuo at 30° C., 3.9 g. of 1-(4'-chloro-6'-methoxy-s-triazin - 2'-yl)-1-methyl-piperidinium-sodium perchlorate-chloride of melting point 195° C. are obtained.

In the same manner, 1-[4'-chloro-6'-(β-methoxyethoxy)-s-triazin-2'-yl]-1-methyl-piperidinium perchlorate of melting point 144° C. is obtained from N-methylpiperidine by reaction with 2,4-dichloro-6-(β-methoxyethoxy)-s-triazine, whilst with 2-chloro-4-ethoxy-6-(β-methoxyethoxy)-s-triazine, 1 - [4' - ethoxy-6'-(β-methoxy-ethoxy)-s-triazin-2'-yl]-1-methyl-piperidinium perchlorate of melting point 132° C. is obtained.

Example 18

1.5 g. of sodium perchlorate are dissolved in 40 ml. of anhydrous ethanol. 1.78 g. of 2,4-dichloro-6-ethyl-s-triazine are added to this solution and when all the material has dissolved a solution of 1 g. of pyridine in 20 ml. of anhydrous ethanol is added dropwise. White crystals immediately separate out. After standing for 1 hour, the crystals are filtered off, washed with 20 ml. of ethanol and 20 ml. of ether and dried in vacuo at 40° C. 1.6 g. of 1-(4' - chloro - 6'-methyl-s-triazin-2'-yl)-pyridinium-sodium perchlorate-chloride of melting point 191° C. are obtained.

Example 19

1.2 g. of sodium perchlorate are dissolved in 45 ml. of anhydrous ethanol and 1.8 g. of 4,6-dimethoxy-2-chloro-s-triazine are added. A solution of 0.9 g. of 2-dimethyl-aminoethanol in 20 ml. of anhydrous ethanol is slowly added to the former solution. The mixture is stirred for 24 hours and the crystals which have separated out are filtered off, washed with 30 ml. of anhydrous ethanol and 30 ml. of ether and dried in vacuo at 40° C. 1.9 g. of N,N-dimethyl-N-(β-hydroxyethyl)-N-(4,6 - dimethoxy-s-triazin - 2-yl)-ammonium-sodium perchlorate-chloride of melting point 187° C. are obtained.

Example 20

12.2 g. of 2-chloro-4,6-diethoxy-s-triazine are dissolved in 200 ml. of anhydrous ether and a solution of 6.8 g. of N-ethylpiperidine in 50 ml. of anhydrous ether is added dropwise at 5° C. whilst stirring. The mixture is stirred for a further 24 hours at room temperature and the crystals which have separated out are filtered off, washed with 50 ml. of ether and dried in vacuo at 20° C. 1.45 g. of 1 - (4',6' - diethoxy-s-triazin-2'-yl)-1-ethyl-piperidinium chloride of melting point 89° C. are obtained.

Example 21

1.75 g. of 2-chloro-4,6-dimethoxy-s-triazine and 1.5 g. of sodium perchlorate are dissolved in 50 ml. of anhydrous ethanol and a solution of 1.73 g. of 3-isobutoxy-methyl-tetrahydro-1,3-oxazine is added dropwise at 5 to 10° C.

The mixture is stirred for 24 hours at room temperature, 20 ml. of anhydrous ether are added, and the crystals which have separated out are filtered off, washed with 100 ml. of anhydrous ether and dried in vacuo at 40° C. 0.9 g. of 3-(4',6'-dimethoxy-s-triazin - (2'-yl) - 3 - isobutoxymethyl-tetrahydro - 1,3 - oxazinium-sodium perchlorate-chloride of melting point 290 to 300° C. is obtained.

Example 22

1.4 g. of sodium perchlorate and 2.04 g. of 2-chloro-4,6-diethoxy-s-triazine are dissolved in 50 ml. of anhydrous ethanol and a solution of 1.4 g. of N,N-dimethyl-benzylamine is slowly added. The mixture is stirred for 1 hour and the crystals which have separated out are filtered off, washed with 50 ml. of anhydrous ethanol and 50 ml. of ether and dried in vacuo at 40° C. 3.9 g. of N,N-dimethyl-N-benzyl - N - (4,6 - diethoxy-s-triazin-2-yl)-ammonium-sodium perchlorate-chloride of melting point 89° C. are obtained.

Example 23

3.6 g. of 2,4-dichloro-6-methoxy-s-triazine are dissolved in a solution of 1.4 g. of sodium perchlorate in 30 ml. of acetonitrile and 1 ml. of N-methylmorpholine is added at −15° C. The mixture is left to stand for one hour at room temperature and the resulting precipitate is filtered off and washed with acetonitrile and ether. After drying in vacuo at 33° C., 3.7 g. of 4-(4'-chloro - 6' - methoxy-s-triazin - 2' - yl) - 4 - methyl-morpholinium-sodium perchlorate-chloride of melting point 162° C. are obtained.

Example 24

1.28 g. of 2-chloro - 4 - methoxy-6-p-chlorophenyl-s-triazine are dissolved in 50 ml. of ether and a solution of 0.7 g. of N-methylmorpholine in 20 ml. of ether is added at room temperature. The mixture is stirred for 24 hours and the crystals which have separated out are filtered off, washed with 30 ml. of ether and dried in vacuo at 20° C. 1.2 g. of 4-(4'-methoxy - 6' - p - chlorophenyl-s-triazin-2'-yl) - 4 - methyl-morpholinium chloride of melting point 167° C. are obtained.

Under identical conditions, 1-(4'-chloro - 6' - phenyl-sulphonamido-s-triazin - 2' - yl) - 1 - methyl-piperidinium chloride of melting point 103° C. (decomposition) is obtained from 2,4 - dichloro - 6 - phenylsulphonamido-s-triazine and N-methylpiperidine.

Example 25

1.9 g. of 2,4,6-trichloropyrimidine and 1.5 g. of sodium perchlorate are dissolved in 50 ml. of ethanol and a solution of 1 g. of N-methylpiperidine dissolved in 10 ml. of ethanol is added at 0° C. The mixture is stirred for 1 hour at room temperature and the crystals which have separated out are filtered off, washed with 50 ml. of ethanol and dried in vacuo at 30° C. 1.4 g. of 1-(2',4'-dichloro-pyrimidin - 6' - yl) - 1 - methyl-piperidinium-sodium perchlorate-chloride of melting point 206° C. are obtained.

Example 26

1.5 g. of sodium perchlorate and 2.3 g. of 2-chloro-4-methoxy - 6 - (piperidin - 1' - yl)-s-triazine are dissolved in 150 ml. of ethanol and a solution of 1 g. of N-methyl-piperidine in 20 ml. of ethanol is added at 0° C. The mixture is stirred for 24 hours at room temperature, an insignificant amount of material which has separated out is filtered off and the filtrate is evaporated to dryness in vacuo at 30° C. bath temperature. 4.2 g. of 1-[4'-methoxy-6'-(piperidin - 1" - yl)-s-triazin - 2' - yl]-1-methyl-piperidinium-sodium perchlorate-chloride of melting point 120° C. are obtained.

Example 27

5.6 g. of sodium perchlorate and 3.6 g. of 2-methoxy-4,6-dichloro-s-triazine are dissolved in 150 ml. of anhydrous ethanol at 0° C. and a solution of 4 g. of N-methylpiperidine in 20 ml. of anhydrous ethanol is added dropwise over the course of 1 hour at this temperature, whilst stirring. After stirring for 14 hours at room temperature, the crystals which have separated out are filtered off, washed with 40 ml. of anhydrous ethanol, recrystallised from ethanol and dried for 4 hours in vacuo at 40° C. 3.4 g. of 2-methyl - 4,6 - bis-(1'-methyl-piperidino)-s-triazine diperchlorate of melting point 177 to 178° C. are obtained.

Example 28

1.0 g. of 2-chloro - 4,6 - diethoxy-s-triazine and 0.8 g. of sodium perchlorate are dissolved in 25 ml. of anhydrous ethanol at 25° C. and 0.7 g. of 4-methyl-thio-morpholine 1,1-dioxide dissolved in 10 ml. of anhydrous ethanol is added dropwise over the course of 30 minutes, whilst stirring. The mixture is stirred for 4 hours at room temperature and the crystals which have separated out are filtered off, washed three times with 20 ml. of anhydrous ethanol at a time and dried in vacuo at 20° C. 16 g. of 4 - (4',6' - diethoxy-s-triazin - 2' - yl) - 4 - methyl - 1,1-dioxothiomorpholinium-sodium perchlorate-chloride of melting point 183° C. (decomposition) are obtained.

Example 29

6.1 g. of 2-chloro - 4,6 - diethoxy-s-triazine and 4.4 g. of sodium perchlorate are dissolved in 85 ml. of anhydrous ethanol at 5° C. and 3.93 g. of N,N-dimethylglycine-ethyl ester are added to this solution over the course of 30 minutes at 3 to 5° C. The mixture is stirred fo 24 hours at room temperature, the sodium chloride which has separated out is filtered off, the filtrate is concentrated to 40 ml. on vacuo at 30° C. bath temperature and is cooled to 0° C., and the crystals which have separated out are filtered off, washed with 25 ml. of ethanol and dried in vacuo at 25° C. 6.2 g. of N,N-dimethyl-N-ethoxycarbonylmethyl - N - (4,6 - diethoxy-s-triazin - 2 yl)-ammonium perchlorate of melting point 117° C. are obtained.

If instead of the N,N-dimethylglycine-ethyl ester, β-dimethylamino-propionic acid ethyl ester is used, N,N-dimethyl - N - (β - ethoxycarbonyl) - ethyl - N - (4,6 - diethoxy-s-triazin - 2 - yl)-ammonium perchlorate of melting point 65° C. is obtained.

Example 30

1.4 g. of sodium perchlorate are dissolved in 35 ml. of anhydrous ethanol at 5° C.; 2.1 g. of 2-chloro-4,6-diethoxy-s-triazine are then added and 1 g. of N-methylpiperidine dissolved in 10 ml. of anhydrous ethanol is added to the clear solution at 5° C. After standing for 24 hours, the crystals which have separated out are filtered off, washed with 100 ml. of ethanol and dried in vacuo at 30° C. After recrystallisation from ethanol, 1,(4',6'-diethoxy-s-triazin-2'-yl) - 1 - methylpiperidinium perchlorate of melting point 109° C. is obtained.

1-(4'-Methoxy-6'-ethoxy-s-triazin - 2' - yl)-N-methylpiperidinium perchlorate-chloride (melting point 185° C.) and 1-[4',6'-di-(β - methoxyethoxy) - s-triazin-2'-yl]-1-methylpiperidinium perchlorate (melting point 92° C.) are obtained in the same manner.

Example 31

A solution of 15 g. of N-methylpiperidine in 30 ml. of anhydrous ethanol is slowly added dropwise to a mixture of 30.6 g. of 2,4-diethoxy-6-chloro-5-triazine and 16 g. of finely powdered sodium tetrafluoborate in 170 ml. of anhydrous ethanol at 0 to 5° C. After standing for 28 hours, the precipitate is filtered off and washed with 150 ml. of ethanol. The residue is introduced into 50 ml. of hot water and the mixture is immediately filtered into an ice-cooled receiver. After standing for 6 hours in ice, the product is filtered off and washed with a little ice water and is then dried in vacuo at 40° C. 37.4 g. of 1-(4',6'-diethoxy-s-triazin-2'-yl)-1-methylpiperidinium tetrafluoborate of melting point 101° C. are obtained.

Example 32

1.7 g. of dimethylaminopropine in 10 ml. of ethanol are added to a mixture of 4.12 g. of 2-chloro-4,6-diethoxy-s-triazine and 2.8 g. of sodium perchlorate in 50 ml. of anhydrous ethanol. After 3 hours the precipitate is filtered off and introduced into 250 ml. of warm ethanol, the sodium chloride is filtered off and the product is crystallised by cooling the filtrate. 5.8 g. of N-(4',6'-diethoxy-s-triazin-2'-yl) - N - propinyl-2-)-N,N-dimethylammonium perchlorate of melting point 144° C. are obtained.

With N-(δ-cyanobutyl)-pyrrolidine, 1-(4',6'-diethoxy-s-triazin-2'-yl)-1-(δ-cyanobutyl) - pyrrolidinium perchlorate (melting point 94° C.) is obtained in the same manner.

Example 33

1.6 g. of pyridine in anhydrous ethanol are added to a mixture of 4.1 g. of 2-chloro-4,6-diethoxy-s-triazine and 2.8 g. of sodium perchlorate in 70 ml. of anhydrous ethanol. After 24 hours the precipitate is filtered off and recrystallised from ethanol. 4.9 g. of 1-(4',6'-diethoxy-s-triazin-2'-yl)-pyridinium perchlorate of melting point 127° C. are obtained.

1-(4',6'-Diethoxy-s-triazin-2'-yl) - 4-methylpyridinium perchlorate (melting point 178° C.), 1-(4',6'-diethoxy-s-triazin-2'-yl)-3,5-dimethylpyridinium perchlorate (melting point 151° C.) and N-(4,6-diethoxy-s-triazin-2-yl)-N,N,N-triethylammonium perchlorate (melting point 116° C.) are manufactured in the same manner.

Example 34

1.3 g. of N-methylpiperidine in 10 ml. of anhydrous ethanol are added dropwise to a mixture of 2.5 g. of 2-chloro-4-methoxy-6-cyanomethoxy-s-triazine and 1.8 g. of sodium perchlorate in 20 ml. of anhydrous ethanol. After 1 hour, 20 ml. of ether are added and the precipitate is filtered off and well washed with ether. The residue is introduced into 15 ml. of ice-cold 20% strength sodium perchlorate solution, well mixed, and left for 3 hours in ice. After filtering off, washing and drying at room temperature, the product is recrystallised from acetone/ether. 3.0 g. of 1-(4'-methoxy-6'-cyanomethoxy-s-triazin-2'-yl)-1-methylpiperidinium perchlorate of melting point 194° C. (decomposition) are obtained. The compounds listed in the table below were manufactured in the same manner.

| No. | Compound | M.P.,° C. |
|---|---|---|
| 34.1 | N-(4-methoxy-6-cyanomethoxy-s-triazin-2-yl)-pyridinium perchlorate. | 175 |
| 34.2 | 1-(4-methoxy-6'-phenoxy-s-triazin-2'-yl)-1-methyl-piperidinium perchlorate. | 163 |
| 34.3 | 1-(4'-chloro-5'-cyano-pyrimidin-2'-yl)-1-methyl-piperidinium perchlorate. | 193 |
| 34.4 | 1[4',6'-di-(2",2",2"-trichloroethoxy)-s-triazin-2'-yl]-1 methylpiperidinium perchlorate. | 111 |

Example 35

2.2 g. of N-methyl-piperidine in 10 ml. of anhydrous ethanol are added dropwise to a mixture of 2.9 g. of 2,4-dichloro - 6-(N-methlyl-N',N' - dimethylsulphamoyl-amino)-s-triazine and 3 g. of sodium perchlorate in 30 ml. of anhydrous ethanol. After standing for 1 hour, 30 ml. of ether are added and the precipitate is filtered off and after washing with ether is left to stand for 15 hours at 0° C. in 20 ml. of 20% strength sodium perchlorate solution. The resulting crystals are filtered off and dried in vacuo and are then recrystallised from acetone/ether. 2.1 g. of 2-(N-methyl-N',N'-dimethylsulphamoylamino) - 4,6 - bis-(N-methylpiperidinium)-s-triazine perchlorate of melting point 171° C. are obtained.

Example 36

1.75 g. of pyridine in 10 ml. of anhydrous ethanol are added to a mixture of 3.5 g. of 2,4-dichloro-5-cyanopyrimidine and 4.1 g. of ammonium hexafluophosphate in 30 ml. of anhydrous ethanol. After 1 hour, 60 ml. of ether are added, the mixture is filtered and the residue is washed with ether and suspended in 15 ml. of cold saturated ammonium hexafluophosphate solution. After standing for half an hour in ice, the product is filtered off, washed and dried in vacuo. 3.5 g. of the substance thus obtained on recrystallisation from acetone/ether yield 2.4 g. of N-(4-ethoxy-5-cyano-pyrimidin-2-yl)-pyridinium hexafluophosphate of melting point 195° C.

The use of compounds according to the invention is explained by the examples which follow. In these, percentages denote percentages by weight.

Example 37

20 ml. portions of a 10% strength gelatine solution are diluted with 10 ml. of water. The hardeners indicated in Examples 1 to 36 are added, in the form of a 1% strength aqueous solution, to this gelatine solution until the desired concentration is reached. The resulting mixture is cast on a film of size 18 cm. x 24 cm. and after setting is dried at 38° C. circulating air temperautre. After a storage time of 24 hours, the melting points are determined by dipping in a stirred water bath which is heated to the boil at a speed of about 2.5° C./minute. The temperature at which the layer detaches from the base and dissolves is regarded as the melting point. The results are given in Table I.

TABLE I

| Hardener example number | Concentration g. of hardener/ 100 g. of gelatine | Melting point in ° C. after 24 hours |
| --- | --- | --- |
| 1 | 1 | 90 |
|  | 1.5 | >95 |
| 2 | 1 | 90 |
|  | 1.5 | >95 |
| 3 | 1 | 90 |
|  | 1.5 | >95 |
| 4 | 1 | 90 |
|  | 1.5 | >95 |
| 5 | 1 | 90 |
|  | 1.5 | >95 |
| 6 | 1 | 90 |
|  | 2 | >95 |
| 7.1 | 3 | *>95 |
| 7.2 | 1 | *>95 |
| 8 | 1 | 94 |
|  | 2 | >95 |
| 9 | 6 | 95 |
| 10.1 | 1 | 94 |
| 10.2 | 1 | 95 |
| 11.1 | 3 | >95 |
| 11.2 | 1.5 | *>95 |
| 12 | 1 | 85 |
|  | 2 | >95 |
| 13 | 3 | 85 |
|  | 4 | >95 |
| 14 | 2 | 76 |
|  | 3 | >95 |
| 15 | 3 | 75 |
|  | 4 | >95 |
| 16 | 1 | 95 |
|  | 2 | >95 |
| 17.1 | 4 | 95 |
| 17.2 | 2 | >95 |
| 17.3 | 2 | >95 |
| 18 | 2 | 95 |
|  | 3 | >95 |
| 19 | 2 | 69 |
|  | 3 | >95 |
| 20 | 0.5 | *>95 |
|  | 1 | *>95 |
| 21 | 4 | 80 |
|  | 6 | 95 |
| 22 | 6 | 75 |
| 23 | 1 | 95 |
|  | 2 | >95 |
| 24.1 | 3 | >95 |
| 24.2 | 3 | >95 |

TABLE I—Continued

| Hardener example number | Concentration g. of hardener/ 100 g. of gelatine | Melting point in ° C. after 24 hours |
| --- | --- | --- |
| 25 | 2 | 89 |
|  | 3 | >95 |
| 26 | 2 | *>95 |
| 27 | 2 | 53 |
|  | 3 | >95 |
| 28 | 1 | 69 |
|  | 2 | >95 |
| 29.1 | 0.5 | >95 |
| 29.2 | 1 | >95 |
| 30.1 | 1 | >95 |
| 30.2 | 1 | >95 |
| 30.3 | 1 | >95 |
| 31 | 1 | >95 |
| 32.1 | 1 | >95 |
| 32.2 | 2 | >95 |
| 33.1 | 1 | >95 |
| 33.2 | 1.5 | *>95 |
| 33.3 | 1.5 | >95 |
| 33.4 | 1.5 | *>95 |

*72 hours' storage at 43° C. and 69% relative humidity.

In the examples which follow, the reciprocal swelling factors are quoted instead of the melting points, these factors being determined as follows:

The layers which each still contain a small amount of a blue dyestuff to facilitate the measurement, are prepared, and stored, as described above. The layer thicknesses are determined under the microscope. The swelling of the layer takes place at 22° C. in distilled water.

$$\frac{1}{SF} = \frac{\text{Thickness of the dry layer}}{\text{Thickness of the swollen layer}}$$

| Hardener example number | Concentration g. of hardener/ 100 g. of gelatine | $\frac{1}{SF}$ |
| --- | --- | --- |
| 34 | 2.5 | ¹ 0.124 |
| 34.1 | 2.4 | ² 0.120 |
| 34.2 | 2.8 | ¹ 0.153 |
| 34.3 | 2.3 | ¹ 0.187 |
| 34.4 | 4.0 | ¹ 0.142 |
| 35 | 4.3 | ² 0.228 |
| 36 | 2.6 | ² 0.111 |

¹ After 2 days at 43° C. and 69% relative atmospheric humidity.
² After 7 days at 43° C. and 69% relative atmospheric humidity.

Example 38

100 g. of a silver bromide emulsion containing 8% of gelatine and having a pH of 7 are diluted with 80 ml. of water and 8 ml. of a 2% strength aqueous solution of 1-(4',6'-dimethoxy-s-triazin-2'-yl)-1-methyl-piperidinium chloride (Example 2) are added. 30 ml. of the resulting mixture are cast on a film of size 18 cm. x 24 cm. and after setting the film is dried at 38° C. circulating air temperature. After 24 hours' storage the layer shows a melting point of above 95° C.

Example 39

60 ml. of a silver bromide-iodide emulsion containing 8% of gelatine are diluted with 60 ml. of water. 20 ml. portions of this diluted emulsion are respectively mixed with 2, 3 or 4 ml. of a 1% strength solution of 1-(4'-chloro-6'-ethyl - s-triazin-2'-yl)-pyridinium perchlorate (Example 19) and cast on a film of size 18 cm. x 24 cm. After setting, the films are dried at 38° C. circulating air temperature. After 25 hours' storage the melting points are 44° C., 54° C. and above 95° C., respectively.

Example 40

30 ml. of a 5% strength aqueous polyvinyl alcohol solution are mixed with 9.6 ml. of a 1% strength solution of the compound mentioned in Example 2 and cast on a film of size 18 cm. x 24 cm., and after setting the layer is dried at a circulating air temperature of 38° C. The melting point of the polyvinlyl alcohol layer is 75° C.

A layer manufactured and dried analogously, without the addition of the compound mentioned in Example 2, showed a melting point of 34° C.

Example 41

6.6 ml. of a silver bromide emulsion having a silver content of 53 g. of Ag/kg. of emulsion, and containing 8% of gelatine, are mixed with 6.6 ml. of a 1% strength aqueous solution of the hardener from Example 16. This emulsion is cast on glass plates of size 13 cm. x 18 cm. and is dried for 24 hours with circulating air at 24° C.

One strip from this plate is exposed under a step wedge of factor 0.15 and is developed and fixed as indicated below. A second strip from this plate is stored for 6 days at 43° C. and 69% relative humidity and is then developed and fixed in the same manner. The sensitvity is measured 1.5 in excess of the fogging. The resulting values are summarised in the table which follows.

TABLE III

| | M.P., °C. | Fogging | Sensitivity | γ |
|---|---|---|---|---|
| Without hardener | 36 | 0.16 | 1.15 | 3 |
| Without hardener after storage | 36 | 0.16 | 1.20 | 2.8 |
| Hardener from example 16 | 88 | 0.14 | 1.20 | 2.8 |
| Hardener from example 16 after storage | 95 | 0.14 | 1.32 | 2.8 |

Developer:
- 1 g. of p-methylaminophenol sulphate
- 4 g. of hydroquinone
- 20 g. of anhydrous sodium sulphate
- 10 g. of anhydrous sodium carbonate
- 2 g. of potassium bromide
- 960 ml. of water Fixing bath:
- 200 g. of crystalline sodium sulphate
- 15 g. of anhydrous sodium thiosulphate
- 785 ml. of water Processing:
- 10 minutes developing
- 2 minutes soaking
- 6 minutes fixing followed by 30 minutes soaking

Example 42

6.0 ml. of a 6% strength gelatine solution, 1.0 ml. of a 1% strength solution of a dyestuff of the formula

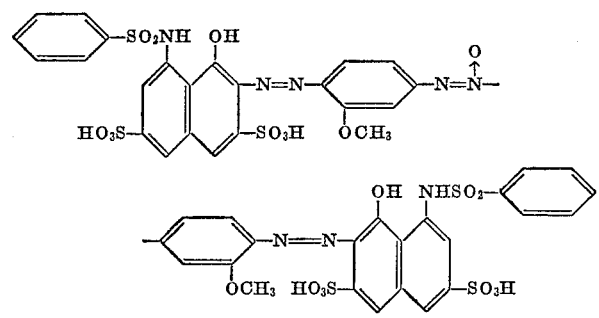

1.0 ml. of an aqueous solution which contains 25 mmols of the compound 34.3 and 4.0 ml. of water are cast at 40° C. onto a triacetate film of size 13 x 18 cm. mounted on a glass plate. After setting, the film is stored for 2 days at 43 °C. and 69% relative humidity. After this time, a homogeneous layer having a reciprocal swelling factor of 0.187 is obtained.

Example 43

12 ml. portions of an aqueous solution which contains 3% of gelatine, 0.08% of a red, diffusion-resistant dyestuff and, in the case of samples 43.3 and 43.4, 0.009% of 1,4-diazabicyclo-[2.2.2]-octane (DABCO) are cast on substrated glass plates of size 13 x 18 cm. After the layers have been dried for 15 hours at room temperature, 12 ml. of an aqueous solution containing 3% of gelatine, 0.08% of a diffusion-resistant blue dyestuff and 0.15% of the compound 30.1 are cast over them. This casting takes place once immediately after preparation of the solution and again after the solution has been kept at 40° C. for 6 hours. After seven days' storage at 43° C. and 69% relative atmospheric humidity the reciprocal swelling factors are determined as described in Example 37. The values thus obtained are listed in Table IV.

TABLE IV

| Sample No. | | Immediate | | After 6 hours | |
|---|---|---|---|---|---|
| | | L | U | L | U |
| 43.1 | Without DABCO | 0.156 | 0.158 | | |
| 43.2 | do | | | 0.132 | 0.142 |
| 43.3 | With DABCO | 0.181 | 0.151 | | |
| 43.4 | do | | | 0.178 | 0.139 |

NOTE.—L=lower layer. U=upper layer.

We claim:

1. A process for crosslinking hydrophilic colloids containing amino, imino and/or hydroxyl groups, which comprises using a crosslinking compound of which the half-life for decomposition in aqueous solution at 40° C. is at least 8 hours; and which corresponds to the formula

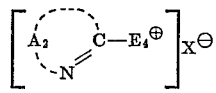

where

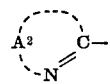

denotes a triazine radical substituted by halogen atoms and/or alkoxy groups and/or alkyl, halogenoalkyl, aryl or aryloxy groups, or lower alkylamino or sulphonamido groups, a pyrimidine radical substituted by halogen atoms and/or lower alkyl or alkoxy groups and/or nitrile groups, a quinazoline radical substituted by one or more halogen atoms or a quinazoline radical substituted by one or more halogen atoms and lower alkyl groups, $E_4^\oplus$ denotes an alkylammonium radical of which the quaternary linking nitrogen atom is substituted by an alkyl, alkenyl, alkinyl, carboalkoxyalkyl, cyanoalkyl or alkoxyalkyl radical with a total of 1 to 5 carbon atoms, the cyclohexyl radical or the benzyl radical, a monocyclic cycloammonium radical substituted at the quaternary linking nitrogen atom by an alkyl radical which is unsubstituted or substituted by nitrile or alkoxy, with a total of 1 to 5 carbon atoms, and of which the quaternary linking nitrogen atom belongs to a 5-membered or a 6-membered monocyclic aliphatic ring which may contain a further nitrogen, sulphur or oxygen atom, or a pyridine ring which is optionally substituted by alkyl with 1 to 3 carbon atoms or acylamino with a total of 2 to 3 carbon atoms, and $X^\ominus$ denotes an anion.

2. A process according to claim 1, which comprises using a compound of the formula

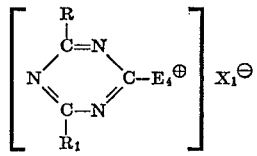

(VIII)

wherein $E_4^\oplus$ has the meaning indicated in claim 1 and R represents a chlorine atom, an unsubstituted alkoxy group or an alkoxy group substituted by halogen, or a nitrile or alkoxy group, $R_1$ represents an unsubstituted alkoxy group or an alkoxy group substituted by halogen or a nitrile or alkoxy group, a phenyl radical which is unsubstituted or substituted by a chlorine atom, an amino radical substituted by alkyl groups with 1 to 4 carbon atoms, a piperidino radical or a phenylsulphonamido radical, and $X^\ominus$ denotes a halogen, nitrate, sulphate, perchlorate, fluoroborate, thiocyanate, sulphamate, hexafluophosphate, hexafluoantimonate or hexafluostannate ion.

3. A process according to claim 2, which comprises using compounds of the formula VIII, wherein $E_4^\oplus$ and $X_1^\ominus$ have the meanings indicated in Claim 2 and R and $R_1$ each denote a methoxy, ethoxy, cyanomethoxy, 2,2,2-trichloroethoxy or β-methoxyethoxy radical.

4. A process according to Claim 3, which comprises using a compound of the formula

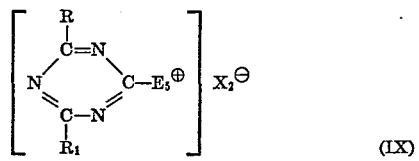

(IX)

wherein R and $R_1$ have the meaning indicated in Claim 10 and $E_5^\oplus$ denotes the pyridinium radical, a 1-lower alkyl-morpholinium or -thiomorpholinium radical, a 1-lower alkyl or cyanoalkyl-pyrrolidinium radical, a trialkyl- or N,N-dialkyl-N-cyanoalkylammonium radical with 1 to 3 carbon atoms per alkyl radical, an N,N-dialkyl-N-cyclohexylammonium radical, a 1-lower alkyl-piperidinum radical or an N,N-dialkyl-N-alkoxycarbonyl-alkylammonium radical and $X_2^\ominus$ denotes a perchlorate, chloride, fluoborate or hexafluophosphate ion.

5. A process according to Claim 4, which comprises using compounds of the formula IX, wherein $E_5^\oplus$ denotes the 1-methyl- or 1-ethylmorpholinium radical, the 1-mehtyl- or 1-ethyl-piperidinium radical, the 1-methyl- or 1-(4'-cyanobutyl)-pyrrolidinium radical, the N,N-dimethyl - N - cyanomethyl- or N,N-dimethyl-N-(β-cyanoethyl)-ammonium radical, the N,N-dimehyl-N-ethoxycarbonylmethyl- and the N,N - dimethyl-N-(β-ethoxycarbonyl)-ethyl-ammonium radical or the N,N-dimehyl-N-propin-2-yl-ammonium radical.

6. A process according to Claim 1, which comprises using compounds of the formula

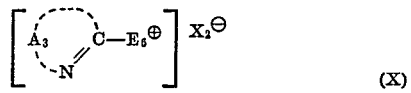

(X)

wherein

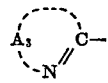

denotes a pyrimidine radical substituted by one or more chlorine atoms and/or a nitrile, methoxy or ethoxy group or a quinazoline radical substituted by a chlorine atom, $E_6^\oplus$ denotes a pyridinium radical, a 1-lower alkyl-morpholinium radical or a 1-lower alkyl- piperidinium radical and $X_2^\ominus$ denotes a perchlorate, chloride, fluoborate or hexafluophosphate ion.

7. A process according to Claim 6, which comprises using compounds of the formula X, where $E_6^\oplus$ denotes the 1-methyl- or 1-ethyl-morpholinium radical or the 1-methyl- or 1-ethyl-piperidinium radical.

8. A process according to Claim 1, which comprises using compounds of the formula

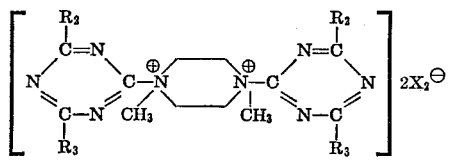

wherein $R_2$ and $R_3$ each denote a methoxy or ethoxy radical and $X_2^\ominus$ denotes the perchlorate, chloride or fluoborate ion.

9. A process according to Claim 1, which comprises using the compound of the formula

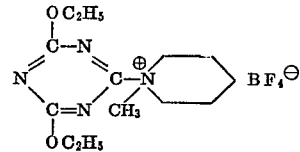

10. A process according to Claim 1, which comprises using the compound of the formula

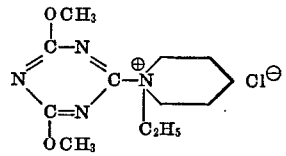

11. A process according to Claim 1, which comprises using the compound of the formula

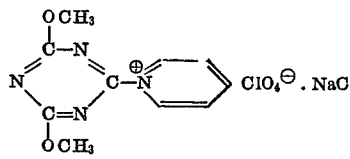

12. A process according to Claim 1, which comprises using the compound of the formula

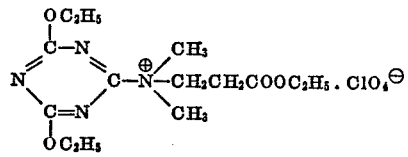

References Cited

UNITED STATES PATENTS

| | | | |
|---|---|---|---|
| 3,674,767 | 7/1972 | Lilly et al. | 260—91.3 VA |
| 3,251,642 | 5/1966 | Valentine et al. | 260—117 X |
| 3,642,908 | 2/1972 | Burness et al. | 260—117 X |

HOWARD E. SCHAIN, Primary Examiner

U.S. Cl. X.R.

96—111; 260—117